United States Patent
Kang

(10) Patent No.: US 7,565,012 B2
(45) Date of Patent: Jul. 21, 2009

(54) METHOD AND APPARATUS FOR GENERATING ELECTRONIC DOCUMENT BY CONTINUOUSLY PHOTOGRAPHING DOCUMENT IN MOVING PICTURE

(75) Inventor: Woo-seok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 11/165,065

(22) Filed: Jun. 24, 2005

(65) Prior Publication Data

US 2006/0008156 A1    Jan. 12, 2006

(30) Foreign Application Priority Data

Jul. 12, 2004    (KR)    ...................... 10-2004-0054078

(51) Int. Cl.
*G06K 9/34*    (2006.01)
(52) U.S. Cl. ...................... 382/176; 382/107; 382/236; 382/173; 382/260; 382/232; 358/1.18
(58) Field of Classification Search ................ 382/107, 382/236, 176, 173, 260, 232; 358/1.18, 1.14, 358/462
See application file for complete search history.

(56) References Cited

U.S. PATENT DOCUMENTS 5,737,740 A * 4/1998 Henderson et al. .......... 715/210
6,188,799 B1 * 2/2001 Tan et al. .................... 382/260
6,687,420 B1 2/2004 Matsuda et al.
2003/0113015 A1 * 6/2003 Tanaka ...................... 382/176

FOREIGN PATENT DOCUMENTS

| JP | 5-159096 A | 6/1993 |
| JP | 5-189691 A | 7/1993 |
| JP | 7-121793 A | 5/1995 |
| JP | 8-137909 A | 5/1996 |
| JP | 11-7493 A | 1/1999 |

\* cited by examiner

*Primary Examiner*—Matthew C Bella
*Assistant Examiner*—Ali Bayat
(74) *Attorney, Agent, or Firm*—Sughrue Mion, PLLC

(57) ABSTRACT

A method for generating an electronic document by continuously photographing a document having many pages as a moving picture includes: photographing the document and generating moving picture data; detecting data of one page of the document by performing motion estimation on the moving picture data, performing document recognition on the data of the one page, and storing the data of the one page as text data; detecting whether data of a next page is input by performing motion estimation on the moving picture data, performing document recognition on the data of the next page, and storing the data of the next page as text data; and storing the text data for all of the pages as one electronic document. Thus, a document having multiple pages may be easily converted into an electronic document by photographing a single moving picture without having to individually photograph each page of the document.

20 Claims, 4 Drawing Sheets

METHOD AND APPARATUS FOR GENERATING ELECTRONIC DOCUMENT BY CONTINUOUSLY PHOTOGRAPHING DOCUMENT IN MOVING PICTURE

BACKGROUND OF THE INVENTION

This application claims priority from Korean Patent Application No. 10-2004-0054078, filed on Jul. 12, 2004, in the Korean Intellectual Property Office, the disclosure of which is incorporated herein in its entirety by reference.

1. Field of the Invention

Apparatuses and methods consistent with the present invention relate to generating an electronic document by continuously photographing a document in a moving picture, and more particularly, to generating an electronic document by continuously photographing a document having a plurality of pages in a moving picture.

2. Description of the Related Art

Due to recent developments in moving picture compression technologies, portable device manufacturing technologies, and small size storage devices, portable devices that can photograph moving pictures such as digital camcorders or mobile phones having a built-in digital camera have been developed. Such devices can generate, edit, and store multimedia data whenever and wherever since the devices can be carried around with ease.

To convert a printed document, a book, etc. into an electronic document using such devices, conventionally, the document or the book is scanned using a scanner, a digital camera, etc. and the scanned image data is input to a document recognition system. Then, the input image data is recognized using numerous text recognizing algorithms, and the image data is converted into text data.

FIG. 1 is a block diagram of a conventional system that generates an electronic document. An image data inputting unit 110 receives image data of a document or a book that is to be converted into an electronic document via a camera, a scanner, etc. The input image data may, for example, be in a bitmap format. A text recognizing unit 120 recognizes the image data using numerous text recognizing algorithms, and converts the image data into text data. The created text data may be stored in a memory 130. A user interface unit 140 receives a command of a user and transmits the command to a controller 150, which controls the system that generates the electronic document. A display unit 160 displays information such as the result of the text recognition or the status of processing the command of the user. Although not illustrated in FIG. 1, other units such as an edit function performing unit for creating an electronic document in a desired form by editing the text data stored in the memory 130 may be included in the system.

FIG. 2 is a flowchart of a conventional method of generating an electronic document. A subject that is to be made into an electronic document (e.g., a paper document, a book, etc.) is photographed or scanned using an input device such as a camera or a scanner, and then the photographed or scanned image data is input to the system (S210). Commands such as an input start command may be input via a button, a mouse, etc. included in the user interface unit 140. For example, image data is created by pressing a recording button of a camera or a scan start button of a scanner. The created image data is stored in the memory 130 (S220). Then, text recognition is performed on the stored image data to convert the image data into text data (S230). The text data generated in such a way is stored in the memory 130. The text data generated by the text recognition is converted into an electronic document having a predetermined format set by a user. The electronic document is also stored in the memory 130.

However, if the document is composed of several pages as opposed to just one page, the above-mentioned process is repeated for each of the pages and generates one electronic file for each page. Then, all the electronic files are compiled together to form one electronic file. In this process, results such as an intermediate processing result of the photographed image or a final recognition result are displayed via the display unit 160.

Due to recent developments in image processing and text recognition technologies, there is a very high success rate of text recognition even in images with some deterioration. However, it is inconvenient to process a document with many pages using the conventional method, which generates an electronic document by performing text recognition using a camera or a scanner. That is, when there are many pages in a document that is to be made into an electronic document, image input and text recognition processes need to be repeatedly performed for each of the pages, and additional processes are needed. The additional processes may include separately storing the input image data and the text data created by text recognition, and then compiling the image data and the text data into one electronic document in an editing process. Therefore, much time and money are spent.

SUMMARY OF THE INVENTION

The present invention provides a method and apparatus for creating an electronic document by efficiently converting a document composed of numerous pages into an electronic document by continuously photographing the document using various digital photographing devices that can photograph moving pictures (e.g., a camcorder, a personal digital assistant, a mobile phone, a personal computer camera, etc.) and performing text recognition on the result of continuously photographing the document.

According to an aspect of the present invention, there is provided a method of generating an electronic document. The method includes: photographing a document and generating moving picture data; detecting data of one page of the document by performing motion estimation on the generated moving picture data, performing document recognition on the data of the one page of the document, and storing the data of the one page of the document as text data; detecting whether data of a next page is input by performing motion estimation on the moving picture data, performing document recognition on the data of the next page, and storing the data of the next page as text data; and storing all of the text data as one electronic document.

The detecting the data of the one page includes: performing motion estimation on the generated moving picture data; if the document is double-sided, detecting an edge between the pages within one frame and storing data on two pages as image data after dividing the frame into two pages; and performing document recognition on the image data and storing the recognized text data.

Detecting the data of the one page may include determining whether a total value of a motion value of a current frame is smaller than a predetermined first critical value due to a lack of motion for a predetermined period of time. If the total value of the motion value of the current frame is smaller than the first critical value, one frame is detected among a plurality of frames processed up to that point as one page of a document, document recognition is performed on the one page, and the one page is stored as text data.

Detecting whether the data of the next page is input may include determining whether a total value of a motion value of a current frame is higher than a predetermined second critical value when a motion value increases due to the turning of a page of the document, as well as a starting point of a next page. Furthermore, whether a total value of a motion value of a continually input frame is smaller than a first critical value and whether data of the next page is input may also be determined, and if data of the next page is input, the data of the next page is stored as text data by performing document recognition.

According to another aspect of the present invention, there is provided an apparatus for generating an electronic document. The apparatus includes: an image data inputting unit that photographs a document and generates moving picture data; a motion detecting unit that performs motion estimation on the generated moving picture data and detects motion; a data processing unit that distinguishes pages of the document according to a result of the motion detection and converts a page into text data by performing document recognition on the page.

The apparatus further includes a user interface unit that receives a command from a user and sets a photographing mode for document recognition, sets a mode corresponding to a double-sided document having left and right sides or a double-sided document having top and bottom sides or a single-sided document, and selects a file format in which to store the text data obtained by performing document recognition.

The user interface unit may receive a command from the user for document recognition, while reproducing a pre-stored moving picture, and transmit the command to the data processing unit, such that the data processing unit generates an electronic document regardless of the result of motion detection.

The apparatus further includes a display unit that indicates, for example, whether an image of a current frame is stored without an error, a result of document recognition, or an encountered error.

The data processing unit includes: an image processor that selects a frame of one page according to the result of motion detection; a double-sided document processor that detects an edge between pages within one frame and stores data on two pages as image data after dividing the frame into two pages when the document is a double-sided document; and a document recognizer that performs document recognition on the image data and outputs the image data as text data.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

A method of generating an electronic document according to the present invention converts a document having a plurality of pages into one corresponding electronic document by continuously photographing the document using a digital photographing device that photographs moving pictures, and stores the electronic document. Types of documents that can be converted into an electronic document include a single-sided document in which only one side of a page is shown at once, and a double-sided document in which a left page and a right page, or a top page and a bottom page are shown at once, like a book. Both single- and double-sided documents can be converted into an electronic document.

Figure 1:
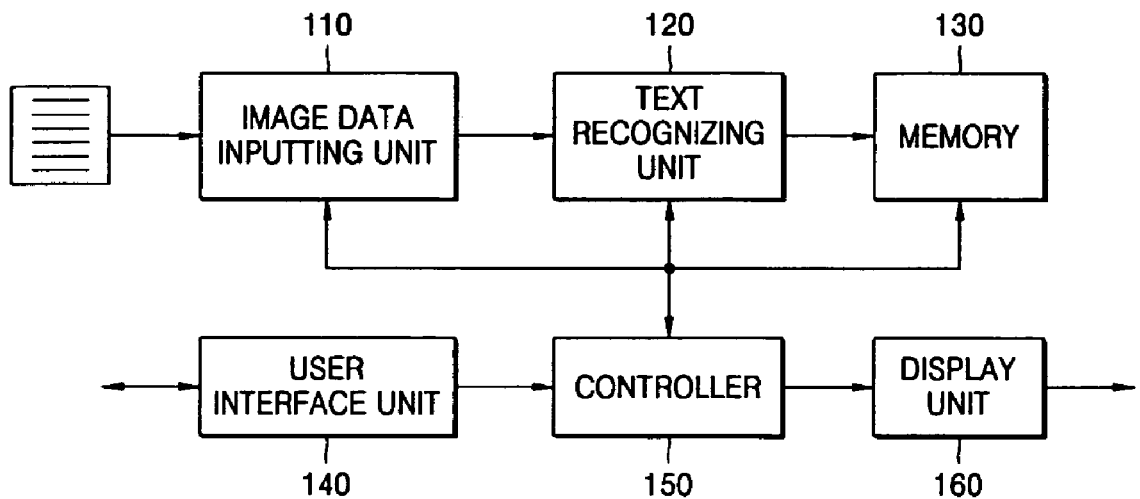
FIG. 1 is a block diagram of a conventional system that generates an electronic document.
Figure 2:
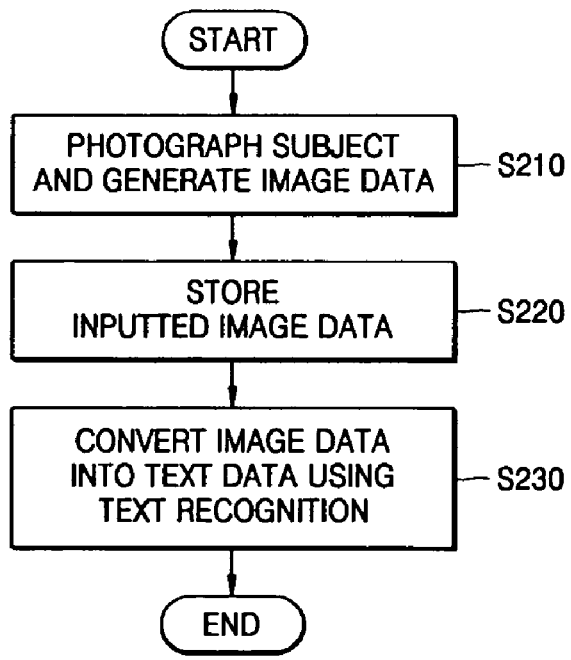
FIG. 2 is a flowchart of a conventional method of generating an electronic document.
Figure 3:
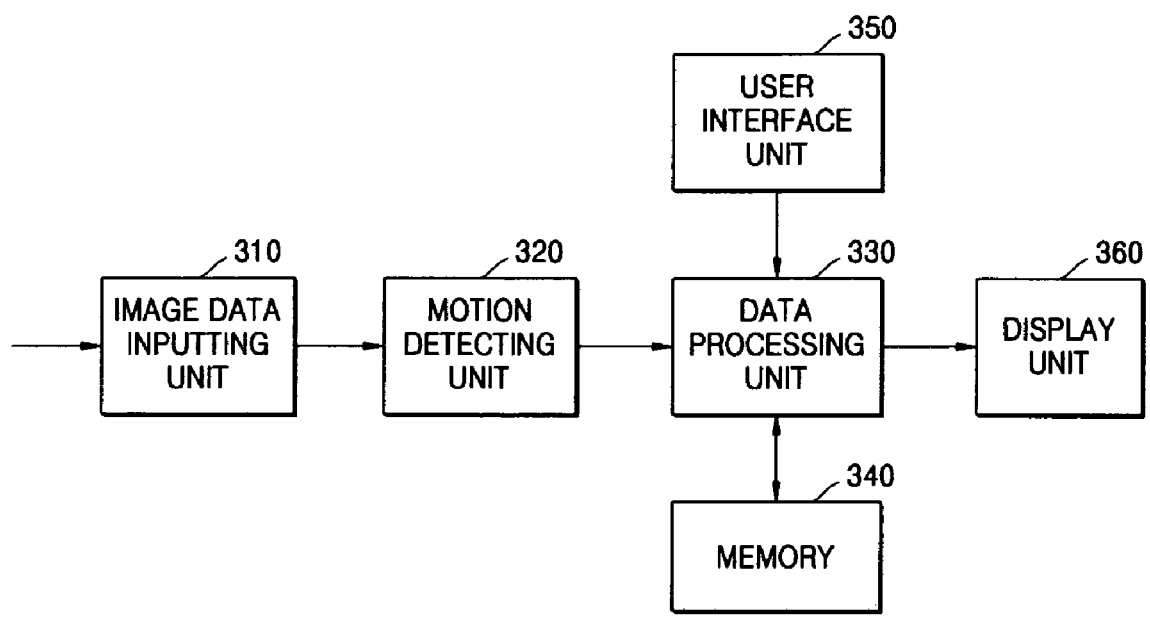
FIG. 3 is a block diagram of an apparatus for generating an electronic document according to an exemplary embodiment of the present invention.

FIG. 3 is a block diagram of an apparatus for generating an electronic document according to an exemplary embodiment of the present invention. The apparatus for generating the electronic document includes an image data inputting unit 310, a motion detecting unit 320, a data processing unit 330, a memory 340, a user interface unit 350, and a display unit 360.

The image data inputting unit 310 photographs a document and converts it into digital moving picture data, and may be any one of a variety of digital photographing devices that can photograph moving pictures. The digital photographing devices include, for example, digital camcorders, personal digital assistants (PDA), mobile phones having a built-in digital camera, personal computer (PC) cameras, and so on. The digital moving picture data photographed in such a way is input to the motion detecting unit 320. The motion detecting unit 320 detects motion captured in a screen. No motion is detected when photographing one page, but when turning the page to photograph the next page, a motion at the screen is detected. Thus, the motion detecting unit 320 detects the motion at the screen and differentiates one photographed page from the next page. The data processing unit 330 converts the generated moving picture image data into text data through double-sided processing and text recognition processing, and then creates an electronic document of a predetermined form. The double-side processing and text recognition processing will be described later.

The memory 340 temporarily stores the moving picture image data or stores the completed electronic document. The user interface unit 350 receives a choice of a user, for example, a photograph start/end command or a photographing option that specifies photographing of a single- or double-sided document. Then, the choice of the user is transmitted to the data processing unit 330, and an electronic document is generated that satisfies the choice of the user. The display unit 360 provides information on an intermediate processing result of an image, a text recognition result of the image, or an electronic document processing result to the user.

Figure 4:
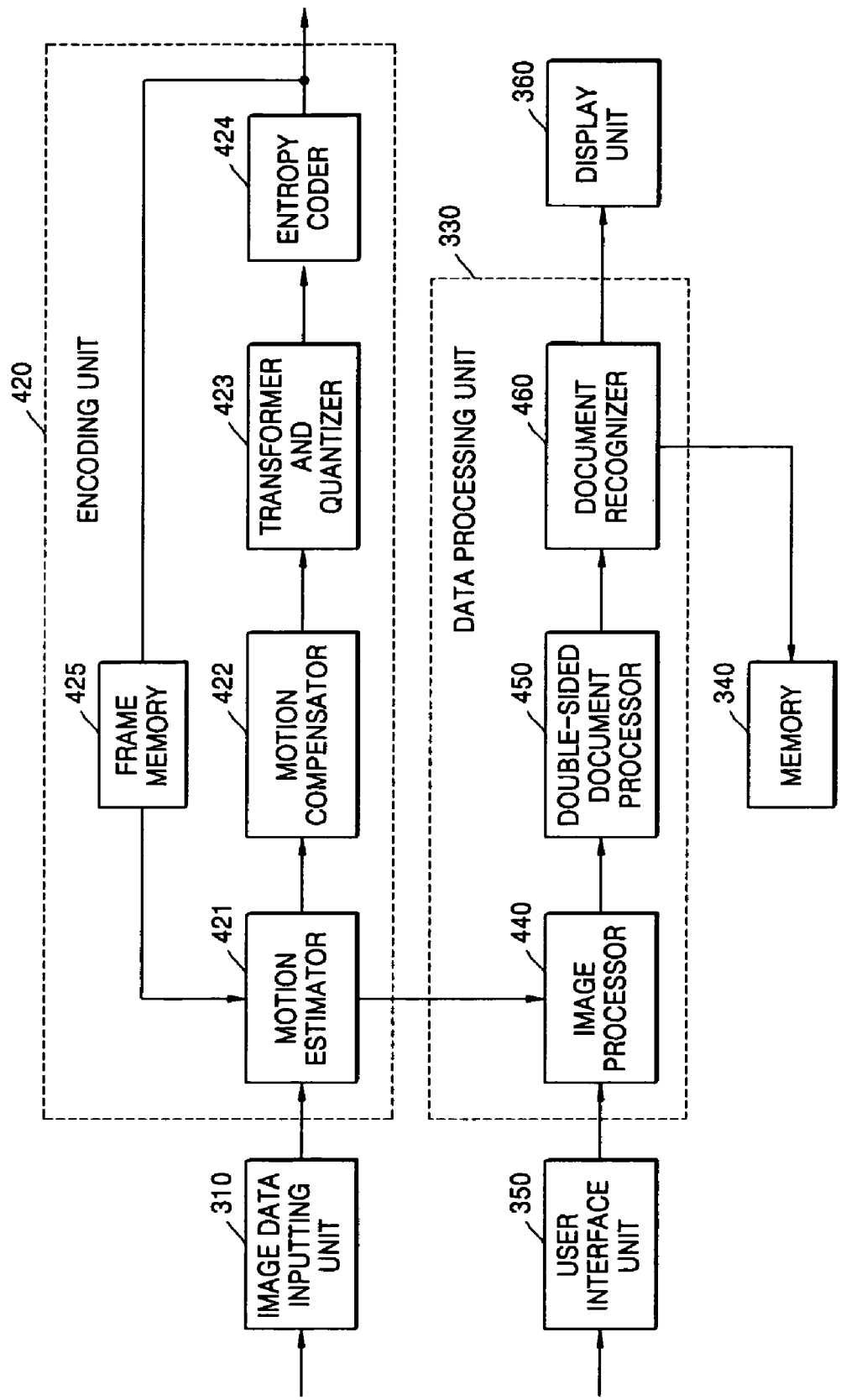
FIG. 4 is a detailed block diagram of the apparatus for generating the electronic document illustrated in FIG. 3.

FIG. 4 is a detailed block diagram of the apparatus for generating the electronic document illustrated in FIG. 3. A digital photographing device that photographs moving pictures, such as a digital camcorder, performs compression encoding on an input image. An encoding unit 420 that performs such compression encoding includes a motion estimator 421, a motion compensator 422, a transformer and quantizer 423, an entropy coder 424, and a frame memory 425. The encoding unit 420 encodes an inputted image according to a predetermined method of compression encoding. The predetermined method of compression encoding may be any method of compression encoding a moving picture based on motion prediction (e.g., a moving picture experts group (MPEG) method and an H.264 method). Also, the digital photographing device that photographs moving pictures may be any one of a digital camcorder, a PDA, a PC camera, and a mobile phone capable of photographing moving pictures.

The image data inputting unit 310 receives a single- or double-sided document via the digital photographing device that photographs moving pictures. The user interface unit 350 receives a photographing mode for document recognition, a selection for a single/double-sided document recognition mode, or a photograph start/end command to create an electronic document from a document composed of a plurality of pages. Also, an electronic document may be manually created by a user by inputting a manual document recognition command at a point the user wants to start document recognition while reproducing the stored moving picture on the digital photographing device. The manual document recognition command is transmitted to the data processing unit 330 via the user interface unit 350.

The encoding unit 420 performs encoding of the moving picture received from the image data inputting unit 310 according to a motion prediction algorithm. In this process, the motion estimator 421 calculates motion information from the inputted moving picture, and transmits the motion information to an image processor 440. That is, the motion estimator 421 finds a motion prediction of a macro block of the current frame from a predetermined search region within a reference frame and calculates the difference in motion with the previous frame. The image processor 440 selects a frame that is the object of document recognition and processes it into an image appropriate for document recognition based on the motion information received from the motion estimator 421. In other words, the image processor 440 receives the motion information from the motion estimator 421, which indicates until when the moving picture data corresponds to one page, selects the most focused frame among the moving picture data on the same one page, and makes the frame into one document image. That is, the image processor 440 converts the frame into a form in which text recognition can be performed on one page.

A double-sided document processor 450 divides one frame into two when in the double-sided document recognition mode. The method of dividing the frame into two will be described later with reference to FIG. 5. A document recognizer 460 extracts information such as character information or image information from the image created in such a way. The document that is to be recognized may be, for example, a text document, a pictorial document, or a photo document. When the document is a text document, the document recognizer 460 performs text recognition on a moving picture that is the object of the text recognition, which is stored in the memory 340, detects only recognizable moving images, and stores the result in the memory 340 according to a file format a user has set or records the result in one or more external storage devices. After the photographing of the document is finished, the photographed electronic document may be transmitted outside the apparatus via an external interface such as a serial communication port or a universal serial bus (USB), or via a network.

When a user wishes to store the inputted moving picture data while performing document recognition, other components included in the encoding unit 420 compress the inputted moving picture data. The display unit 360 provides the result of the document recognition process. A storage unit (e.g., memory 340) temporarily stores the moving picture data of the document, or stores the completed electronic document. When the inputted document is an address list or in a foreign language, the stored electronic document may be converted into an address list form or may be automatically translated by a translating unit (not shown) that may be further included in the apparatus.

Figure 5:
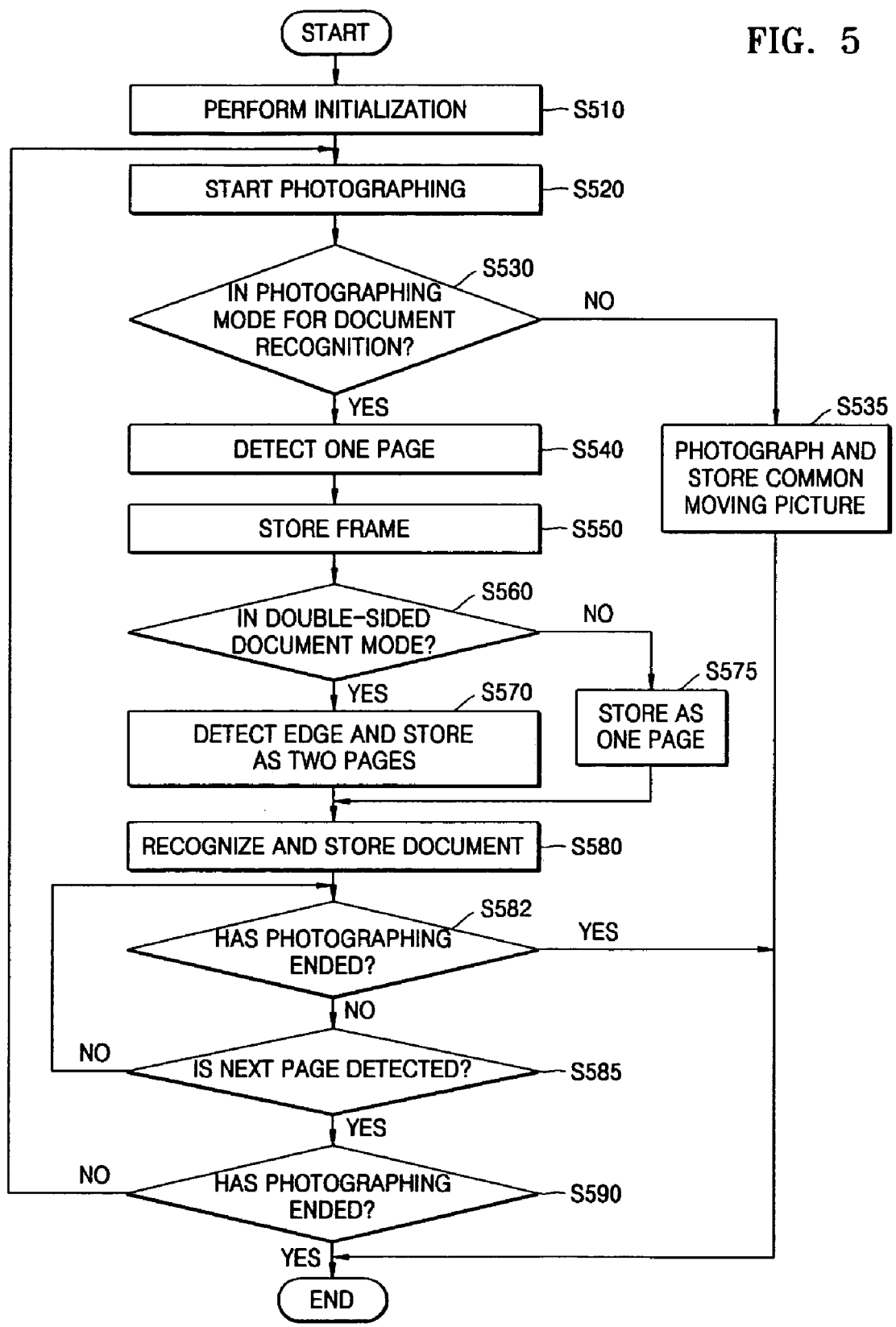
FIG. 5 is a flowchart of a method of generating an electronic document according to an exemplary embodiment of the present invention.

FIG. 5 is a flowchart of a method of generating an electronic document according to an exemplary embodiment of the present invention. First, the apparatus for generating the electronic document is initialized (S510). That is, a user first sets a photographing mode for document recognition via the user interface unit 350, and then sets left and right or top and bottom double-sided document, or single-sided document recognition mode, and chooses a file format (e.g., "pdf," "txt," etc.) in which a document recognition result is to be stored. Thus, the preparation to photograph the object of photographing (e.g., a novel, a telephone book, a photograph, etc.) is completed.

After the preparation is completed, a photograph start command is transmitted to the apparatus via the user interface unit 350 and photographing of the object commences (S520). That is, the photograph start command is transmitted to the apparatus by pressing a photograph button of, for example, a digital camcorder, a PDA, or a mobile phone, or otherwise activating a photographing device, for example, a PC camera.

The data processing unit 330 determines whether the apparatus for generating the electronic document is in a photographing mode for document recognition (S530). If the photographing mode for document recognition is set during initialization (S510) to create an electronic document, photographing for recognizing a document is performed, and if an ordinary moving picture photographing mode is set, a compressed moving picture is generated and stored as in a common moving picture photographing mode (S535).

If in the photographing mode for document recognition, one page is detected by motion detection in moving picture data (S540). If there is no movement for a predetermined amount of time, it is determined whether a total value of motion for the current frame is less than a predetermined first critical value TH1. Motion is detected to store one frame among a plurality of frames that are sensed up to that point in time as image data corresponding to one page of the document, after determining whether a total value of motion for the current frame is smaller than a first predetermined critical value when there is no motion for a predetermined period of time. In more detail, when photographing of a document starts, a motion value of a moving picture input via the image data inputting unit 310 is calculated for each frame by the motion estimator 421, and then a motion value of the current frame is input to the image processor 440. The image processor 440 finds a first frame that has a total value of the motion value of the currently input frame, which is smaller than the predetermined first critical value TH1, and performs processes needed for document recognition of the selected frame. An example of a process that may be needed for document recognition is an image enhancement process. The first critical value may be set as a small enough value by experimentation. Since there is no motion when recognizing a document, the first critical value is set as close to 0. Also, a predetermined period of time needed to calculate the total value of the motion value, that is, how long it takes to photograph one page, is decided.

The current frame processed in such a way is stored as an image of one page (S550). The user is notified that data of one page is stored without an error via the display unit 360 composed of, for example, a liquid crystal display (LCD) or a light-emitting diode (LED) display. The user may continue to photograph the next page while remaining in the photographing mode since the user is informed that the current page is properly stored.

Next, it is determined whether the current photographing mode is a double-sided document recognition mode (S560). If in the double-sided document recognition mode, an edge is detected at the center portion of the current frame, and then the current frame is stored as two separate pages (S570). In more detail, an edge of the image stored by the image processor 440 is detected by the double-sided document processor 450. An edge is detected at a vertical line at the center portion of a double-sided document composed of left and right sides, and an edge is detected at a horizontal line at the center portion of a double-sided document composed of top and bottom sides. Among the detected edges, a vertical or horizontal edge candidate is selected that is longer than a reference value, which can differentiate the sides of the double-sided document at the center portion of the image. Pages at the left and right or the top and bottom may be separated and individually stored by finding the longest vertical or horizontal edge candidate. If in a single-sided document recognition mode, the double-sided document processor 450 does not operate and the next operation is sent to the document recognizer 460 (S575).

Next, document recognition and storage of the document is performed (S580). Character recognition, which is performed in the case of a text document, may be performed by any one of numerous character recognition algorithms. Text data generated by the character recognition is stored in a storage unit (e.g., memory 340). Then, it is determined whether photographing has ended (S582). If it is determined that the photographing has not ended, the starting point of photographing the next page is detected (S585). By way of example, the starting point of the next page can be detected in the following way. When a page is turned, a motion value increases. Therefore, it is determined whether a total value of the motion value for the current frame is higher than a second critical value TH2. The second critical value may also be decided by experimentation. The second critical value TH2 is higher than the first critical value TH1. That is, a motion value of the continuously inputted frames is continuously checked. If the motion value is higher than the second critical value TH2 for a predetermined period of time, it is determined that is when the user is turning to the next page. If the starting point of the next page is not detected, the process is returned to operation S582. If the starting point of the next page is detected, it is determined whether a photograph end command is received from the user (S590). If the photograph end command is received, the photographing ends. If the photograph end command is not received, the next page of the document is continuously photographed and the document recognition continues.

The method of generating the electronic document may be written as a computer program. Codes and code segments that configure the computer program can be easily construed by computer programmers skilled in the art to which the present invention pertains. Also, the computer program is stored in a computer readable medium, and embodies the method of generating the electronic document by reading and executing the computer program via a computer. The computer readable recording medium includes, for example, magnetic recording media, and optical data storage media.

According to the above-described method and apparatus for creating an electronic document, numerous pages of single- or double-sided paper documents may be easily converted into an electronic document by photographing a single moving picture without making individual scans or photographs of each of the pages of a single- or double-sided paper document. Thus, for example, a telephone book, an address book, etc. may be easily inputted and converted into an electronic document.

Furthermore, converting a document having a plurality of pages into an electronic document can be more readily performed by detecting motion, for example, using a motion estimator included in a conventional moving picture encoding unit. Also, a document stored as text data may be converted into an address list form thorough document recognition. Additionally, by translating a document written in a foreign language through document recognition and outputting the document, the form of the document or the foreign language may be quickly converted or translated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating an electronic document, the method comprising:
   photographing a document having a plurality of pages to generate moving picture data;
   detecting data of one page of the document by performing motion estimation on the moving picture data, performing document recognition on the data of the one page of the document, and storing the data of the one page of the document as first text data;
   detecting whether data of a next page is input by performing motion estimation on the moving picture data, and if the data of the next page is detected, performing document recognition on the data of the next page and storing the data of the next page as second text data; and
   storing the first text data and the second text data as one electronic document.

2. The method of claim 1, further comprising, before the photographing of the document:
   setting a photographing mode for the document recognition via a user interface unit;
   setting a mode corresponding to one of a double-sided document having a left side and a right side, a double-sided document having a top side and a bottom side, and a single-sided document; and
   selecting a format for a file in which the document is stored after being converted into the electronic document.

3. The method of claim 1, wherein the detecting the data of the one page and the detecting whether the data of the next page is input comprises, if a command for document recognition of a frame selected by a user is input while a pre-stored moving picture is being reproduced, performing document recognition of the frame selected by the user and storing the frame as text data.

4. The method of claim 1, wherein the detecting the data of the one page comprises:
   performing motion estimation on the moving picture data;
   if the document is double-sided, detecting an edge between two pages within one frame, dividing the frame into the two pages, and storing data on the two pages as image data; and
   performing document recognition on the image data and storing a recognition result as text data.

5. The method of claim 4, wherein in the detecting of the edge between the two pages, if the double-sided document has a left side and a right side, an edge at a vertical line at a center portion of the frame is detected, and if the double-sided document has a top side and a bottom side, an edge at a horizontal line at a center portion of the frame is detected; the frame is divided into the two pages; and the data on the two pages are stored as the image data.

6. The method of claim 5, wherein in the detecting of the edge between the two pages, one of a vertical edge candidate and a horizontal edge candidate, which is longer than a reference value, is selected, and wherein the reference value can differentiate the two pages at the center portion of the frame at the detected edge, and a left and right page or a top and bottom page are divided by finding the edge with a highest value among the edge candidates.

7. The method of claim 1, wherein in the photographing of the document, the document is photographed using an image data input device, and the moving picture data is generated from the photographed document.

8. The method of claim 7, wherein said image input device is one of a camera, a camcorder, a personal digital assistant, and a personal computer camera.

9. The method of claim 1, wherein in the detecting the data of the one page, whether a total value of a motion value of a current frame is smaller than a predetermined first critical value due to a lack of motion for a predetermined period of time is determined, and if the total value of the motion value is smaller than the first critical value, one frame is detected among a plurality of frames processed up to that point as the one page of the document, document recognition is performed on the one page, and the one page is stored as text data.

10. The method of claim 1, further comprising notifying a user of at least one of whether an image of a current frame is stored without an error, a result of document recognition, and an encountered error via a display unit.

11. The method of claim 1, further comprising, in the detecting of whether the data of the next page is input:

determining whether a total value of a motion value of a current frame is larger than a predetermined second critical value if a motion value increases due to turning of a page of the document; and determining a starting point of the next page of the document.

12. The method of claim 11, further comprising:

determining whether a total value of a motion value of a plurality of continually input frames is smaller than a first critical value, said first critical value being less than said second critical value;

detecting whether data of the next page is input; and performing document recognition on the data of the next page to store the data of the next page as text data.

13. An apparatus for generating an electronic document, comprising:

an image data inputting unit which photographs a document having a plurality of pages and generates moving picture data;

a motion detecting unit which performs motion estimation on the moving picture data to detect motion;

a data processing unit which distinguishes the pages of the document according to a result of the motion detection and converts each of the pages into text data by performing document recognition on the pages; and a user interface unit which receives a command from a user and sets a photographing mode for the document recognition; sets a mode corresponding to one of a double-sided document having a left side and a right side, a double-sided document having a top side and a bottom side, and a single-sided document; and selects a format for a file in which to store the text data obtained by performing the document recognition.

14. The apparatus of claim 13, wherein the user interface unit receives a command from the user for document recognition while reproducing a pre-stored moving picture and transmits the command to the data processing unit, and the data processing unit generates an electronic document from the pre-stored moving picture regardless of the result of the motion detection.

15. An apparatus for generating an electronic document, comprising:

an image data inputting unit which photographs a document having a plurality of pages and generates moving picture data;

a motion detecting unit which performs motion estimation on the moving picture data to detect motion;

a data processing unit which distinguishes the pages of the document according to a result of the motion detection and converts each of the pages into text data by performing document recognition on the pages; and a display unit that indicates at least one of whether an image of a current frame is stored without an error, a result of document recognition, and an encountered error.

16. An apparatus for generating an electronic document, comprising:

an image data inputting unit which photographs a document having a plurality of pages and generates moving picture data;

a motion detecting unit which performs motion estimation on the moving picture data to detect motion;

a data processing unit which distinguishes the pages of the document according to a result of the motion detection and converts each of the pages into text data by performing document recognition on the pages;

wherein the data processing unit comprises:

an image processor that selects a frame of one page according to the result of motion detection;

a double-sided document processor that detects an edge between two pages within one frame; divides the frame into the two pages; and stores data on the two pages as image data, if the document is a double-sided document; and a document recognizer that performs document recognition on the image data and outputs the image data as text data.

17. The apparatus of claim 16, wherein the double-sided document processor detects an edge at a vertical line at a center portion of the frame if the document is a double-sided document having a left side and a right side, or detects an edge at a horizontal line at a center portion of the frame if the document is a double-sided document having a top side and a bottom side, and stores the frame as separate image data corresponding to each of the two pages.

18. The apparatus of claim 16, wherein the image processor determines if a total value of a motion value of a current frame is smaller than a predetermined first critical value due to a lack of motion for a predetermined period of time, and detects one frame among a plurality of frames processed up to that point as one page of the document.

19. The apparatus of claim 16, wherein the image processor determines whether a total value of a motion value of a current frame is larger than a predetermined second critical value if the motion value increases due to turning of a page of the document, and detects a starting point of a next page.

20. A computer readable recording medium, having a computer program recorded thereon, that can be read and executed by a computer, said computer program for generating an electronic document by performing the operations of:

generating moving picture data by photographing a document having a plurality of pages; detecting data of one page of the document by performing motion estimation on the moving picture data, performing document recognition on the data of the one page of the document, and storing the data of the one page of the document as first text data;

detecting whether data of a next page is input by performing motion estimation on the moving picture data, and if the data of the next page is detected, performing document recognition on the data of the next page and storing the data of the next page as second text data; and storing the first text data and the second text data as one electronic document.

* * * * *